(12) United States Patent
Herbert

(10) Patent No.: US 6,963,497 B1
(45) Date of Patent: Nov. 8, 2005

(54) POWER CONVERTER WITH AN INDUCTOR INPUT AND SWITCHED CAPACITOR OUTPUTS

(76) Inventor: Edward Herbert, 1 Dyer Cemetery Rd., Canton, CT (US) 06019-2029

( * ) Notice: Subject to any disclaimer, the term of this patent is extended or adjusted under 35 U.S.C. 154(b) by 578 days.

(21) Appl. No.: 10/234,687

(22) Filed: Sep. 3, 2002

Related U.S. Application Data

(60) Provisional application No. 60/316,402, filed on Sep. 4, 2001.

(51) Int. Cl.[7] .......................... H02M 3/335; H02M 5/42
(52) U.S. Cl. ........................ 363/25; 363/98; 363/133
(58) Field of Search .................... 363/16, 25, 26, 363/20, 132, 19, 133, 97, 98; 323/222, 259

(56) References Cited

U.S. PATENT DOCUMENTS

| | | | | |
|---|---|---|---|---|
| 4,858,093 A | * | 8/1989 | Sturgeon | 363/20 |
| 6,115,267 A | * | 9/2000 | Herbert | 363/25 |
| 6,121,761 A | * | 9/2000 | Herbert | 323/282 |
| 6,195,273 B1 | * | 2/2001 | Shteynberg | 363/26 |

* cited by examiner

Primary Examiner—Rajnikant B. Patel

(57) ABSTRACT

A power converter circuit has an inductor input and switching means to put a pair of capacitors alternately in series or in parallel. By pulse width modulating between the states, the voltage on the capacitors can be controlled over a two to one variation of the input voltage. A pair of transformer isolated power converter sub-circuits can be connected to the capacitors, and their outputs can be combined to provide a single controlled output voltage.

2 Claims, 7 Drawing Sheets

POWER CONVERTER WITH AN INDUCTOR INPUT AND SWITCHED CAPACITOR OUTPUTS

This application is a continuation in part of a provisional patent application of the same name, Ser. No. 60/316,402 filed 4 Sep., 2001. Priority to that date is claimed.

BACKGROUND OF THE INVENTION

This invention relates to DC—DC power converters, and in particular to power converters which regulate the output voltage.

The familiar "Buck converter" is used frequently in power converter circuits. It has the disadvantage that the input is the switching stage so there are large step changes in the input current that are difficult to filter. The familiar "Boost converter" uses an inductor in its input that provides a smoother current wave form, but it is most useful for step up applications and is not optimum for most applications having low voltage outputs.

SUMMARY OF THE INVENTION

The power converter of this invention uses an inductor input but has the characteristics of a buck converter. In the basic power converter circuit, control can be maintained over a two to one change of input voltage, and other embodiments of the invention expand the control range.

Transformer isolation is easily incorporated, and the transformers may have any arbitrary ratio.

One embodiment of the invention has switches that can provide "auto ranging" while another set of switches provides control of the output voltage.

In another embodiment of the invention, the converter of this invention provides a pre-regulating function while regulators on the outputs provide fine control or other functions such as soft start.

DESCRIPTION OF THE PREFERRED EMBODIMENT

Figure 1:
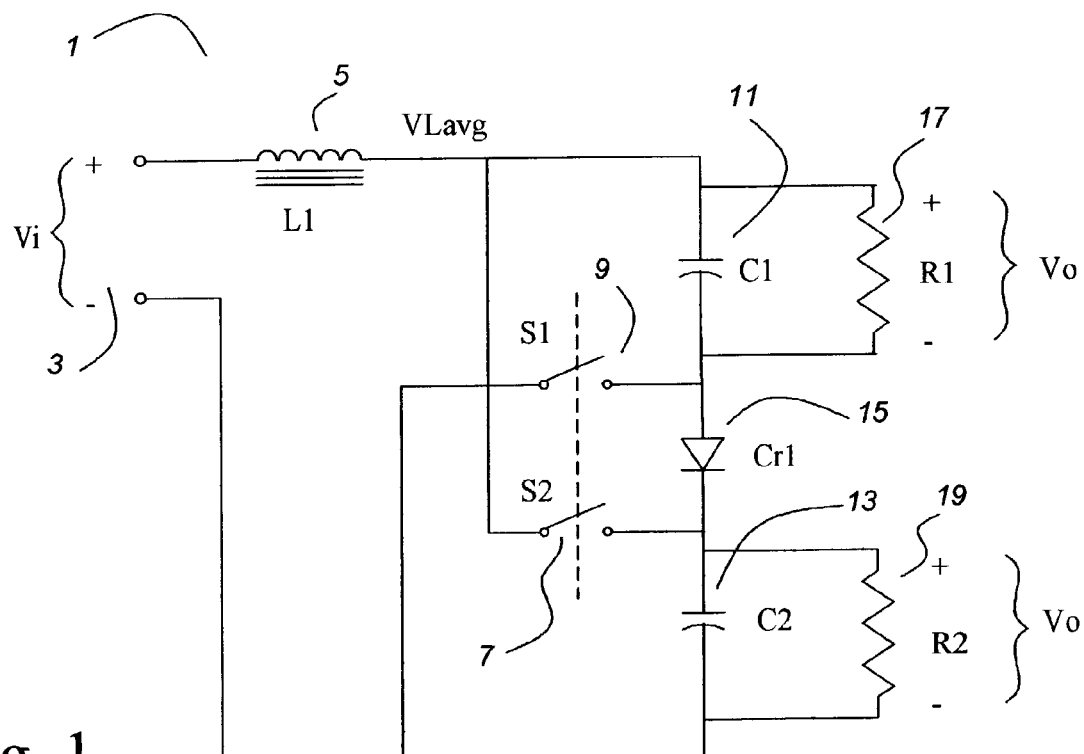
FIG. 1 shows a power converter of this invention.

FIG. 1 shows a power converter 1 of this invention connected to an input voltage source 3 Vi. The input voltage source 3 Vi is connected to a first terminal of an inductor 5 L1. The second terminal of the inductor 5 L1 is connected to the first terminal of a switch 7 S2, and the first terminal of a capacitor 11 C1. The second terminal of the capacitor 11 C1 is connected to the first terminal of a switch 9 S1 and the anode of a rectifier 15 Cr1. The cathode of the rectifier 15 Cr1 is connected to the first terminal of a second capacitor 13 C2 and the second terminal of the switch 7 S2. The second terminal of the switch 9 S1 and the second terminal of the second capacitor 13 C2 are connected to the return of the input voltage source 3 Vi, as more particularly shown in the schematic diagram, FIG. 1. If the input power source 3 Vi is of opposite polarity, the rectifier polarity is reversed.

Switches 9 S1 and 7 S2 preferably are operated synchronously, that is, they are both opened and both closed at the same times.

The power out of the converter of this invention is divided, and, as shown in FIG. 1, the output voltage Vo being controlled appears across both 11 C1 and 13 C2. The voltage Vo on 11 C1 and 13 C2 are equal if the circuit is balanced. That is, if the capacitors 11 C1 and 13 C2 are equal, and if the output loads are equal, shown as an example, not as a limitation, as resistors 17 R1 and 19 R2. Though most power converters have a single regulated output, there are many instances where two outputs would be equally useful. The loads may be heaters used to control temperature, or lamps used to control lighting, as examples and not as limitations and the outputs being separated and at different potentials relative to the return would not be of much consequence.

Looking now at the schematic of FIG. 1, it can be see that when the switches 9 S1 and 7 S2 are open as shown, the capacitors 11 C1 and 13 C2 with their loads 17 R1 and 19 R2 are in series. Assuming balanced ideal components, at steady state DC conditions the output voltage Vo would be one half of the input voltage Vi. The voltage across the inductor 5 L1 is zero.

Consider now the case when both switches 9 S1 and 7 S2 are closed. The lower end of 11 C1 and its load 17 R1 are now connected to Vi return, and the upper end of 13 C2 and its load 19 R2 are now connected to the input power source 3 Vi through the inductor 5 L1. The rectifier 15 Cr1 is reverse biased, and thus is equivalent to an open switch. At steady state DC conditions the output voltage Vo would equal the input voltage Vi. The voltage across the inductor 5 L1 would be zero (assuming ideal components and neglecting losses). Rectifiers are a form of switch, being open when reversed biased and closed when forward biased. A switch or a semi-conductor switch could be substituted for 15 Cr1 as long as it was switched with the appropriate timing. Such an arrangement is known in the art as a "synchronous rectifier", and it is equivalent when applied to the teachings of this invention.

Within the range of control, Vo is controlled by modulating the switches 9 S1 and 7 S2 at a high rate, a rate sufficiently high that there is only a small change in the output voltage Vo, that is, the voltage on the capacitors 11 C1 and 13 C2, and only a small change in the current through the inductor 5 L1, a method that is well known to one skilled in the art of PWM (Pulse Width Modulated) power converter design. The duty cycle D of the switches 9 S1 and 7 S2, is defined as the ratio t/T, where "t" is the time that the switches 9 S1 and 7 S2 are closed, and "T" is the whole period, that is, the sum of the time that the switches are open plus the time that the switches are closed.

Switch schematic symbols are shown for the switches 9 S1 and 7 S2, and for the other switches shown in the several figures and discussed in this specification to generally indicate switching means. The teachings of the invention do not rely upon the nature of the switches, but practical circuits using this invention would preferably use fast semi-conductor switches such as transistors, MOSFET's or IGBT's. The drive circuitry needed to operate such switches is not shown, not being a point of novelty. The design of switch drive circuits and timing and control circuits is well known in the art. Additional ancillary components such as snubbers, EMI suppression filters and enclosures and the like similarly are not shown although they would be needed in a practical circuit. These too are not points of novelty and their use, design and implementation are well known to one skilled in the art of power converters.

In controlled operation, during the time that the switches 9 S1 and 7 S2 are open, the voltage on the output end of the inductor 5 L1 would be 2 Vo, assuming ideal components and a balanced circuit. When the switches 9 S1 and 7 S2 are closed, the voltage on the output end of the inductor 5 L1 would be Vo. The average voltage $V_{Lavg}$ on the output end of the inductor would be Vo times the proportion of time that the switches are closed (D) plus 2 times Vo times the proportion of time that the switches are open (1−D), or $V_{Lavg}$=Vo(D)+2Vo(1−D), which, when simplified, is $V_{Lavg}$=Vo(2−D).

At steady state conditions, the average voltage across the inductor must be zero, so Vi must equal $V_{Lavg}$. Solving for the output voltage Vo gives Vo=Vi/(2−D). The duty cycle D must always be in the range of 0 to 1, so the output voltage is in the range of one half Vi to Vi, with Vo increasing as the duty cycle increases.

Thus it can be seen that the output voltage Vo can be regulated for a two to one range of the input voltage. The output voltage is also well behaved above and below the control range. Below the control range, Vo equals Vi. Above the control range, Vo equals one half Vi, assuming ideal components and a balanced circuit.

Figure 3:
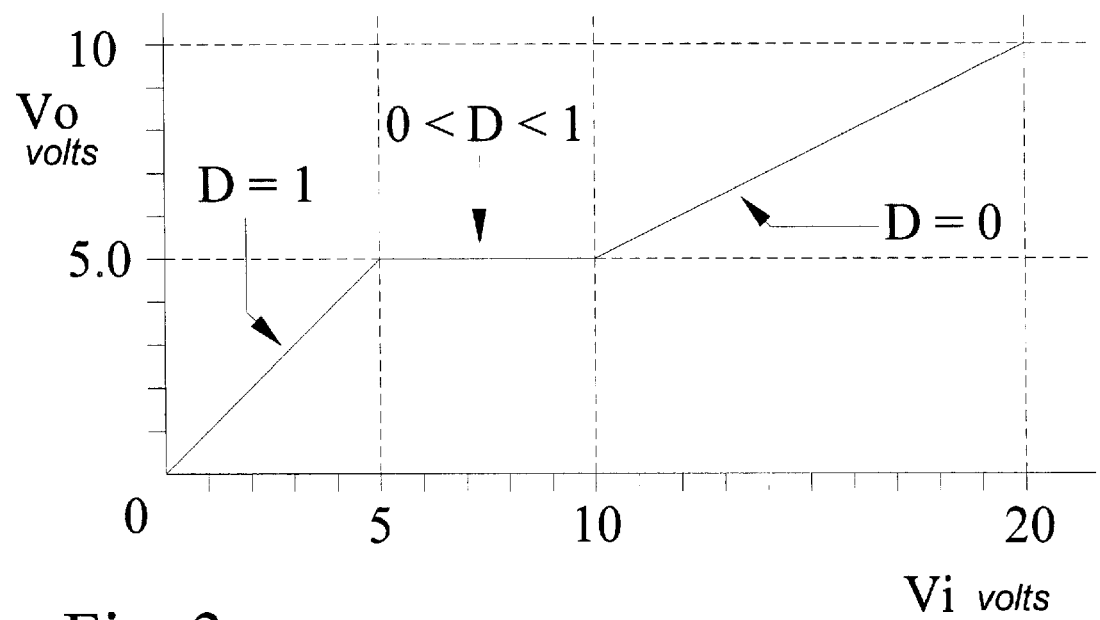
FIG. 3 shows a representative graph of the output voltage versus the input voltage for a power converter of this invention.
Figure 4:
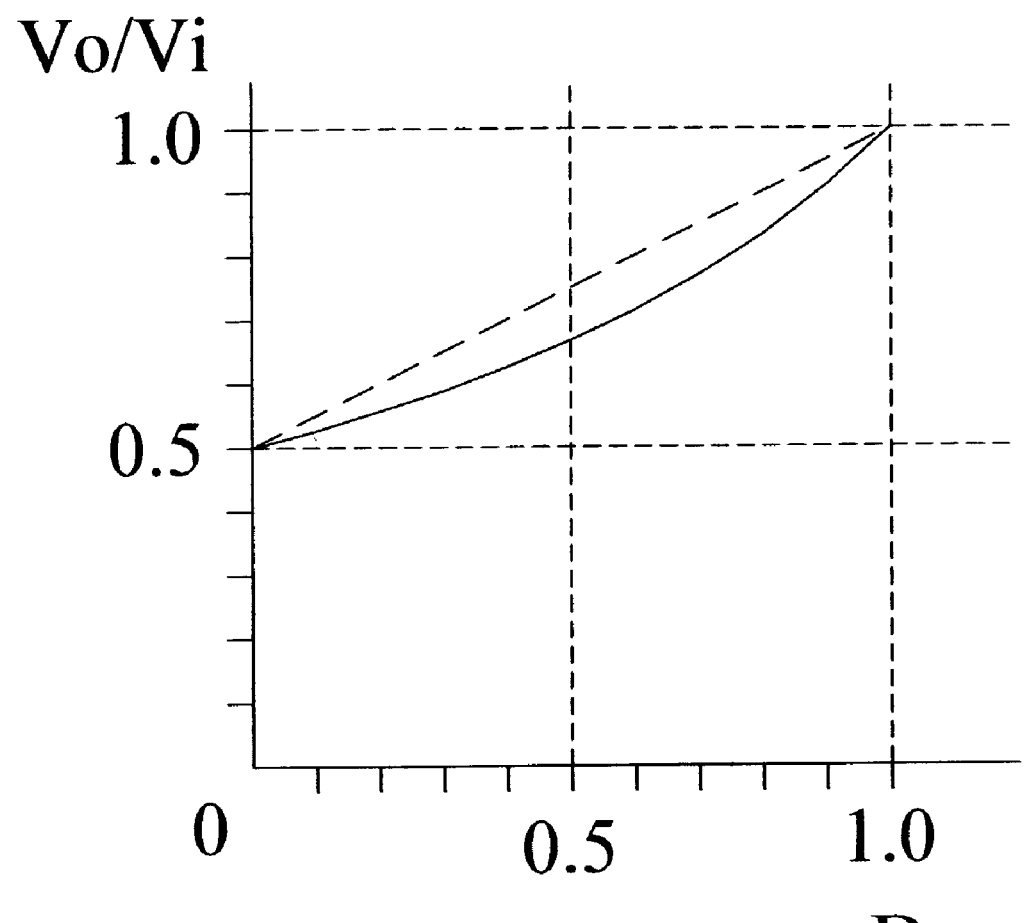
FIG. 4 shows a graph of the transfer function as a function of the duty cycle for a power converter of this invention.

FIG. 3 shows graphically the control capabilities of the power converter circuit of this invention. As an example, not a limitation, let us assume that it is desired to control the output voltage Vo at 5.0 volts. The graph of FIG. 3 shows that for an input voltage Vi between 5 volts and 10 volts, the output voltage Vo can be controlled to exactly 5.0 volts by controlling the duty cycle D over the range of 0 to 1. If the input voltage Vi is less than 5 volts, the duty cycle can be kept at 1, and the output voltage Vo will equal the input voltage Vi (assuming ideal components and ignoring losses). The control circuit cannot control the output voltage Vo if the input voltage Vi is above 10 volts, but the output voltage Vo will be well behaved and will equal one half of the input voltage Vi. The expression Vo=Vi/(2−D) can be rearranged as Vo/Vi=1/(2−D) to give the transfer ratio for the control function, and this function is plotted for D from 0 to 1 in FIG. 4 as a solid line. The function can be seen to be a well behaved function with a positive slope of approximately 0.5, which has been shown as a dashed line. Thus, for a given input voltage, the output voltage rises with increasing duty cycle D, approximately as Vo~(0.5+0.5 D) Vi. The similarity to the control expression (Vo=D Vi) of the well known buck converter is very significant. Because both circuits have an increasing output voltage with increasing duty cycle, controllers that are designed to drive buck converters can be used with the power converters of this invention, and similar techniques can be used to stabilize the feed-back loop, or to implement feed-forward or other control algorithms.

However, in contrast to the buck converter, the power converter of this invention has an inductor in series with the input, which is a very desirable feature in a power converter, as ripple currents in the input are lower.

Figure 2:
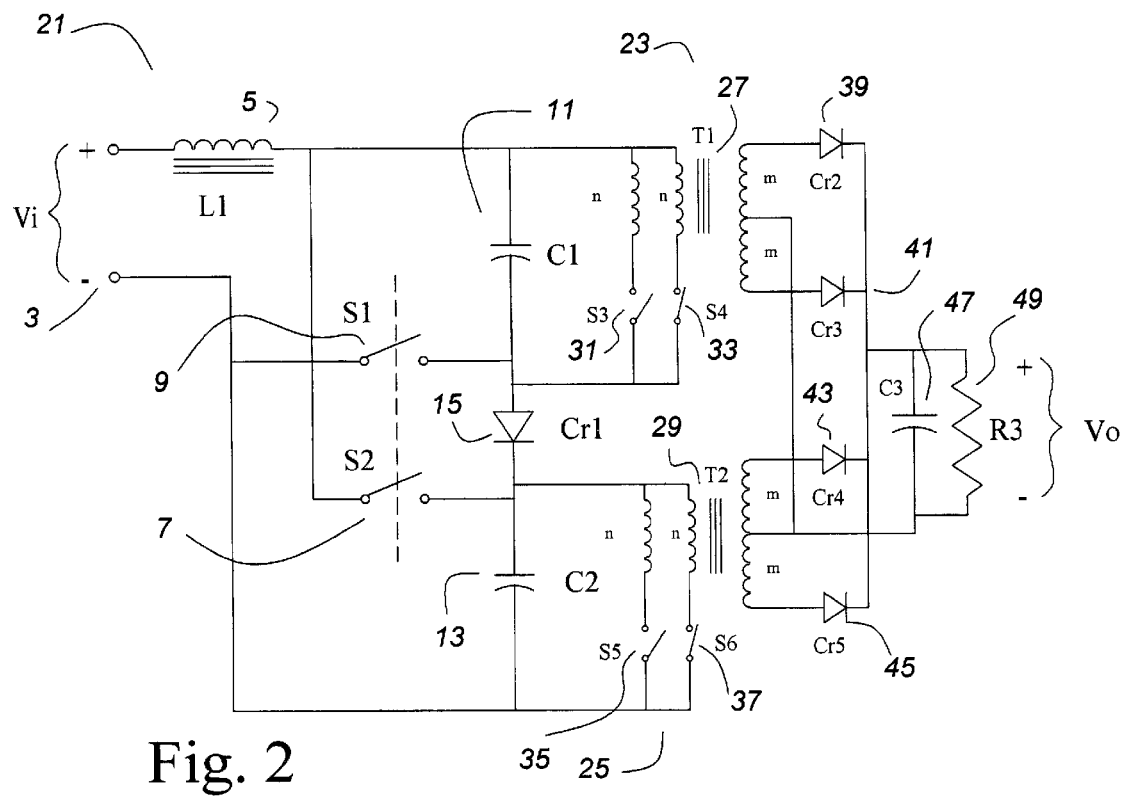
FIG. 2 shows a power converter of this invention having transformer isolation.

FIG. 2 shows a schematic of a power converter 21 which is the power converter 1 of FIG. 1 with the addition of two transformer isolated converter circuits 23 and 25 substituted for the load resistors 17 R1 and 19 R2 of FIG. 1. Because the transformer isolated converter circuits 23 and 25 provide electrical isolation, their outputs can be connected, either in parallel as shown across a capacitor 47 C3 or in series, so that the power outputs which were separated in the power converter 1 of FIG. 1 can be brought together in a single output, Vo. With ideal components and a one-to-one turns ratio in the transformers 27 T1 and 29 T2, the output voltage Vo would be the same as the output voltage Vo of FIG. 1, given similar operating conditions.

In addition to providing electrical isolation, the transformers 27 T1 and 29 T2 can provide a change in voltage and current if they are designed with a turns ratio other than one-to-one, as is well known in the art.

The transformer isolated circuits are shown as an example but not a limitation as identical transformers 27 T1 and 29 T2 having push-pull primaries and push-pull secondaries. The switches 31 S3 and 33 S4 and also the switches 35 S5 and 37 S6 are switched alternately to provide AC excitation to the cores of the transformers 27 T1 and 29 T2 respectively. A number of other primary designs and switch arrangements could provide an equivalent or similar function, as is well known in the art. Rectifiers 39 Cr2 through 45 Cr5 rectify the outputs of the transformers 27 T1 and 29 T2. The outputs are taken to a capacitor 47 C3 and an output load, shown, as an example, not a limitation, as a resistor 49 R3.

If "off the shelf" transformer isolated converter circuits are used, each may have an internal output capacitor. In this case, the capacitor 47 C3 is the sum of the internal output capacitors and a separate output capacitor may not be needed.

The transformer isolated converter circuits 23 and 25 will have a ratio of their input voltage to their output voltage defined as the conversion voltage ratio. If m is the input voltage and n is the output voltage, the conversion voltage ratio will be m to n. The conversion voltage ratio will be influenced by the turns ratio of the transformers 27 T1 and 29 T2, and may additionally be influenced by the converter topology and control characteristics used in the transformer isolated converter circuits 23 and 25, as would be well understood by one skilled in the art of transformer isolated converter design. Thus an advantage of using transformer isolated converters is the ability to change the output voltage up or down, factoring the control characteristics by m to n. Therefore, the ratio of the output voltage Vo to the input voltage Vi will be equal to (m/n)/(2−D), or the transformer conversion ration divided by the difference of two and D.

Another advantage of the transformer coupling is that the circuit can be completely "Off", a state is not possible in the power converter of FIG. 1. Under controlled conditions all of the switches 31 S3 through 37 S6 can be open. As examples, not limitations, all of switches can be open at the instant when the circuit is connected to the voltage source Vi, and they can remain open until it is desired to provide power to the output. Also, the converter could sometimes operated in a "discontinuous mode", in which the current in the inductor 5 L1 decays to zero during the "off" time. If the current has decayed to zero (or nearly so), then all of the switches 31 S3 through 37 S6 may be turned off (opened).

With the transformer coupling of FIG. 2, the converter 21 can be configured so that it can be turned off at any time. However, if there is a significant current flowing in the inductor 5 L1, as might be the case with the output in an overload condition, the energy stored in the inductor would transfer to the capacitors 11 C1 and 13 C2, possibly resulting in an over-voltage on the capacitors. With an over voltage on the capacitors 11 C1 and 13 C2, the control circuit for switches 31 S3 through 37 S6 should preferably leave the switches 31 S3 through 37 S6 in an open state, and this state preferably should be forced if an output overload or over-voltage condition is sensed. The circuit can be modified to provide a discharge path for the current in 5 L1 by any of a number of means as would be well known to one familiar with the art of power converters. As an example, not a limitation, a high voltage energy absorbing device could be connected from the output side of the inductor 5 L1 to the return of the input voltage 3 Vi, for examples, not limitations, a MOV, a Zener diode, a spark gap or other means capable of absorbing energy.

With the power converter circuit 21 of FIG. 2 as an example, not a limitation, in some embodiments of the invention the transformer isolated converter circuits 23 and 25 would not further control the output voltage Vo. As such, they preferably operate switching at nearly 100 percent duty cycle, with minimum off time. The phasing of the switching is preferably offset 90 electrical degrees, so that any notch in the output of one as a consequence of switching one pair of the switches, for example 31 S3 and 33 S4 would occur at an instant while the other pair, for example, 35 S5 and 37 S6 is not switching.

However, it is entirely possible in other embodiments of the invention to design the transformer isolated converter circuits 23 and 25 to have a voltage control function as well. This may require the addition of other components and an appropriate operating sequence and control, which would be well known in the art and it is not point of novelty of this invention. In such an embodiment, the voltage regulation of this invention would regulate the voltage on 11 C1 and 13 C2 which would provide a pre-regulating function for the transformer circuits.

As an example, not a limitation, the secondary circuits of the transformers 27 T1 and 29 T2 could incorporate inductors so that the transformer isolated converter circuits 23 and 25 would be buck converters and the output voltage would be responsive to the duty cycle of the switches 31 S3 through 37 S6 as would be well understood by one familiar with the art of transformer isolated buck converters.

It is also possible that in other embodiments of the invention that the transformer isolated circuits would normally operate at nearly 100 percent duty cycle, as described above, to minimize noise, but they could be designed with the capability of operating in a regulating mode under certain conditions. As examples, not limitations, these conditions could include soft start, output short circuit protection, input over-voltage protection, or during a shut down sequence.

Electrical isolation in just one branch of the circuit is sufficient to enable connecting the output voltages into a single output.

Figure 5:
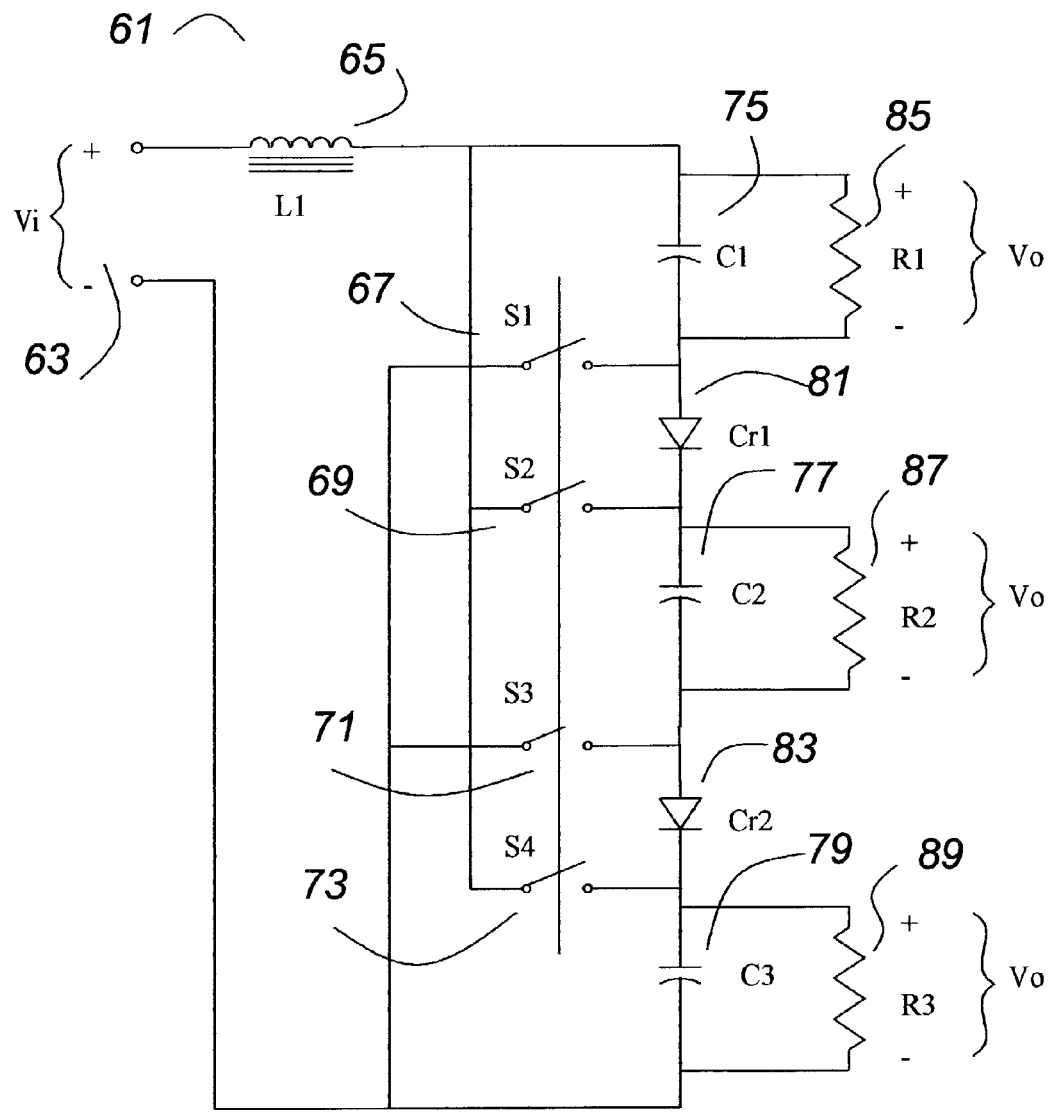
FIG. 5 an alternative embodiment of the invention having an extended control range.

FIG. 5 shows that the teachings of this invention can be extended to provide a greater control range, in this instance, when the power converter circuit 61 has switches 67 S1 through 73 S4 open, the output voltage Vo equals one third of the input voltage Vi, or Vi/3. With switches 67 S1 through 73 S4 closed, the output voltage Vo equals the input voltage Vi. Therefore, for a fixed output voltage Vo, control can be maintained with an input variation from Vi=Vo to Vi=3 Vo. This general arrangement can be extended to any number, to further increase the control range, and the control would be similar to that described above in FIG. 1.

The outputs in FIG. 5 can be transformer coupled to a single output in the manner of FIG. 2, and the transformers may have a non-unity turns ratio.

In the specification and the claims, "connected to" includes a connection through one or more other components as long as the teachings of the invention are used. As an example, in figure one, a first capacitor 11 C1 is connected to a rectifier 15 Cr1. The rectifier 15 Cr1 is then connected to a second capacitor C2 13, which is connected to the return of the power source 3 Vi. In FIG. 5, a first capacitor 75 C1 connects to a rectifier 81 Cr1 and the rectifier 81 Cr1 then connects to a second capacitor 77 C2. The capacitor 77 C2 then connects to the return of the power source 63 Vi through a rectifier 83 Cr2 and a third capacitor C3 79. Although the currents are modified some by the addition of the additional components (after all, that is the purpose of modifying the circuit), the general behavior of the circuit as it relates to the teachings of this invention is the same for the power converter 61 of FIG. 5 as for the power converter 1 of FIG. 1. Thus a recitation of the simple circuit of FIG. 1 in the specification and the claims is intended to include any modification of the circuit made by adding components so long as the teachings of the invention are used.

Figure 6:
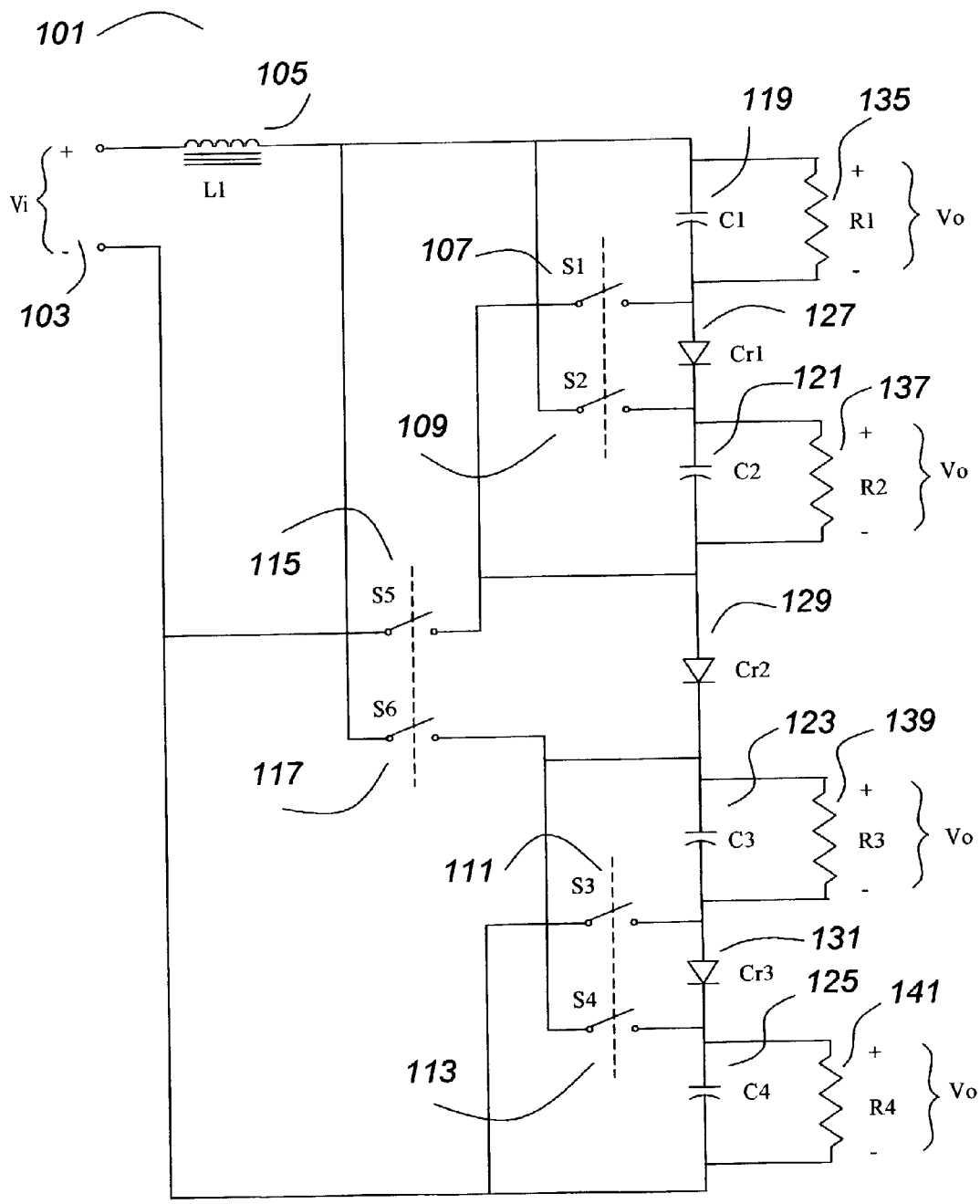
FIG. 6 shows an alternative embodiment of the invention having an extended control range with a binary relationship.

FIG. 6 shows another way in which to extend the control range of the circuits of this invention. It can be seen that the power converter circuit 101 comprises two circuits similar to the circuit of FIG. 1, the first comprising switches 107 S1 and 109 S2 and their closely associated circuitry, and the second comprising switches 111 S3 and 113 S4 and their closely associated circuitry. Each of the two circuits can be controlled independently by modulating the switches associated therewith, however usually the duty cycle of each circuit would be the same as the other if all of the output voltages are to be the same. This is preferred, but there could be exceptions for special operating environments.

Further, switches 115 S5 and 117 S6 can be modulated to so that the two circuits similar to the circuit of FIG. 1 may be in series or in parallel. For the case of the minimum input voltage Vi, all switches 107 S1 through 117 S6 would be closed. For the case of the maximum input voltage Vi, all of the switches 107 S1 through 117 S6 would be open. For intermediate voltages, the six switches 107 S1 through 3117 S6 could be modulated synchronously, to control the output voltage Vo according to the teachings of this invention.

However, the switches may be operated independently in pairs, with some simple constraints. One constraint, mentioned above, is that the duty cycle of the switches 107 S1 and 109 S2 of the first circuit and the duty cycle of the switches 111 S3 and 113 S4 of the second circuit usually must be the same. However the ripple voltage in a combined output voltage Vo (for example, applying the teachings of FIG. 2) would be reduced if the switching in these two circuits occurs with the first set of switches 107 S1 and 109 S2 switched 90 electrical degrees out of phase with respect to the second set of switches 111 S3 and 113 S4.

Moreover, it can be seen that the switches 115 S5 and 1177 S6 have a binary relationship to the other switches, 107 S1 through 113 S4. That is, the control range of switches 107 S1 through 113 S4 is one half to one. The control range of switches 115 S5 and 117 S6 is also one half to one. The product, because they effectively operate in series, is one fourth to one. Thus, if both sets of switches are modulating, the control range is from one fourth of the maximum input voltage to maximum input voltage. As an example, not a limitation, a circuit designed for a maximum input voltage of 300 volts could control the output voltage for a range of 75 volts to 300 volts.

If either set of switches is static in one or the other of its two states, the control range of the circuit is reduced. If the static set is "on", the control range would be one times one half to one, or one half to one. Using the example above, the control range would be 150 to 300 volts. If the static set is "off", the control range would be one half times one half to one, or one quarter to one half Using the example above, the control range would be 75 to 150 volts. Thus the switches 115 S5 and 117 S6 can provide a ranging function, while the other switches 107 S1 through 113 S4 can provide a voltage regulating function.

If the input voltage is varying about the transition point (mid range, 150 volts in the example above), then switches 115 S5 and 117 S6 would need to modulate as well. However, many power converters derive their input voltage from commercial AC power, and commercial power sources are clustered in two levels, one being around 115 VAC and the other being around 230 VAC. The mid range would be in the vicinity of 160 VAC, which is not commonly used commercially. Therefore, it should not be necessary to modulate the switches 115 S5 and 117 S6 in a power converter designed to operate from a DC voltage which was derived by rectifying commercial power. The lower range might, as an example, be from 80 VAC to 160 VAC and the upper range might be from 160 VAC to 320 VAC. Accordingly, the switches 115 S5 and 117 S6 could be used for "auto ranging" while the other switches 107 S1 through 113 S4 could be used for control.

Alternatively, switches 107 S1 through 113 S4 could be static to provide a ranging function and switches 115 S5 and 117 S6 could be modulated for voltage control.

Figure 7:
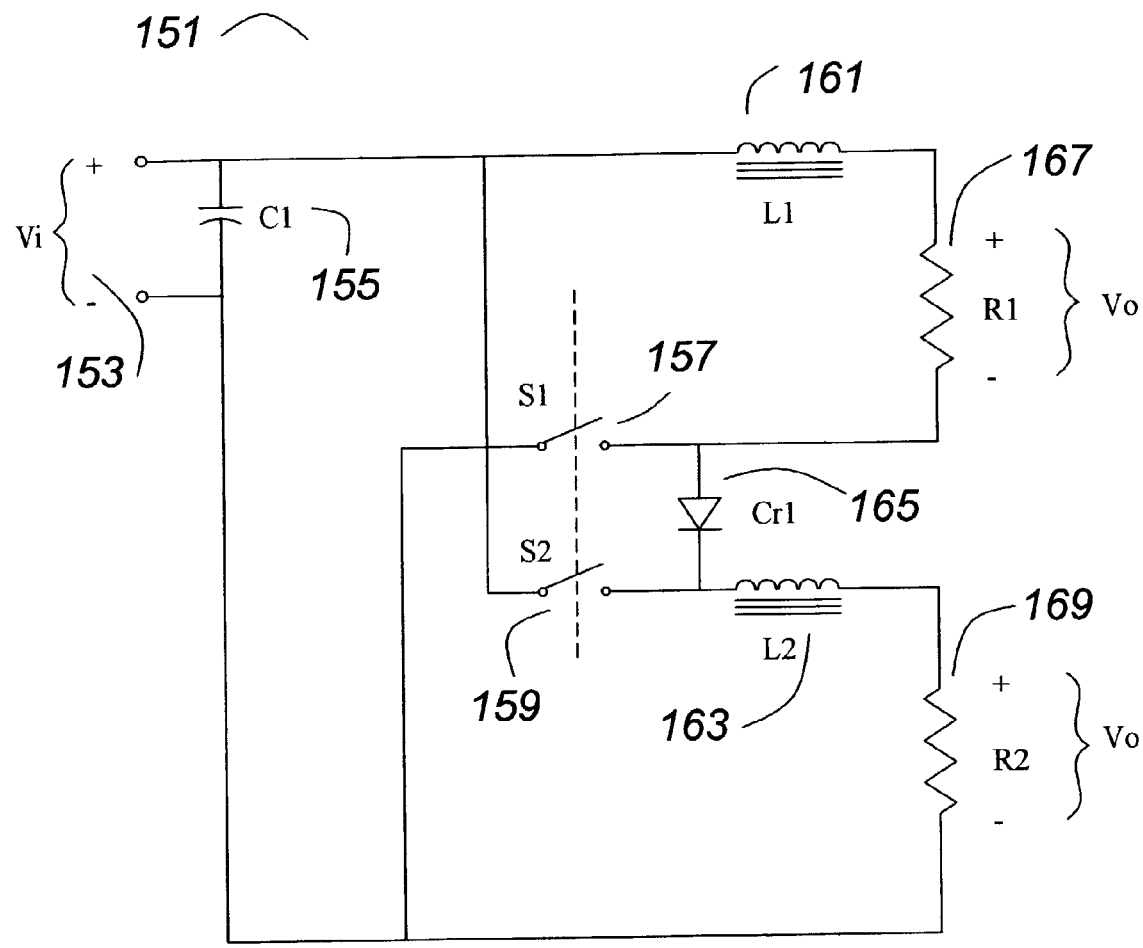
FIG. 7 shows an analog of the circuit of FIG. 1.

FIG. 7 shows a power converter circuit 151 which is a dual to the circuit of FIG. 1, using a capacitor 155 C1 and two inductors 161 L1 and 163 L2 instead of an inductor and two capacitors. Switches 15 S1 and 159 S2 modulate the current which determines the output voltage Vo in the load resistors 167 R1 and 169 R2. Operation is analogous and similarly other duals could be derived for other embodiments of the invention.

I claim:

1. A power converter for converting an input voltage from a power source to an output voltage from the power converter, the power source having an input and a return, comprising an inductor having a first terminal and a second terminal, the first terminal of the inductor being connected to the input of the power source, a first capacitor having a first terminal and a second terminal, the first terminal of the first capacitor being connected to the second terminal of the inductor a rectifier means having a first terminal and a second terminal, the first terminal being connected to the second terminal of the first capacitor, a second capacitor having a first terminal and a second terminal, the first terminal of the second capacitor being connected to the second terminal of the rectifying means, and the second terminal of the second capacitor being connected to the return of the power source, a first switching means having a first terminal and a second terminal, the first terminal of the first switching means being connected to the first terminal of the first capacitor and the second terminal of the first switching means being connected to the first terminal of the second capacitor, a second switching means having a first terminal and a second terminal, the first terminal of the second switching means being connected to the second terminal of the first capacitor and the second terminal of the second switching means being connected to the second terminal of the second capacitor, the first switching means and the second switching means being operated synchronously for pulse width modulation such that the first switching means and the second switching means are closed for a proportion of time D and the first switching means and the second switching means are open for a proportion of time 1−D where D is a number having a value from zero to one to control the output voltage of the power converter, whereby the voltage from the first terminal of the first capacitor to the second terminal of the first capacitor equals the voltage from the first terminal of the second capacitor to the second terminal of the second capacitor, the voltage from the first terminal of the first capacitor to the second terminal of the first capacitor and the voltage from the first terminal of the second capacitor to the second terminal of the second capacitor being the output voltage of the power converter, and whereby the ratio of the output voltage of the power converter to the input voltage of the power source is equal to one divided by the difference of two and D.

2. A power converter for converting an input voltage from a power source to an output voltage from the power converter, the power source having an input and a return, comprising an inductor having a first terminal and a second terminal, the first terminal of the inductor being connected to the input of the power source, a first capacitor having a first terminal and a second terminal, the first terminal of the first capacitor being connected to the second terminal of the inductor a rectifier means having a first terminal and a second terminal, the first terminal being connected to the second terminal of the first capacitor, a second capacitor having a first terminal and a second terminal, the first terminal of the second capacitor being connected to the second terminal of the rectifying means, and the second terminal of the second capacitor being connected to the return of the power source, a first switching means having a first terminal and a second terminal, the first terminal of the first switching means being connected to the first terminal of the first capacitor and the second terminal of the first switching means being connected to the first terminal of the second capacitor, a second switching means having a first terminal and a second terminal, the first terminal of the second switching means being connected to the second terminal of the first capacitor and the second terminal of the second switching means being connected to the second terminal of the second capacitor, the first switching means and the second switching means being operated synchronously for pulse width modulation such that the first switching means and the second switching means are closed for a proportion of time D and the first switching means and the second switching means are open for a proportion of time 1−D where D is a number having a value from zero to one to control the output voltage of the power converter, a third capacitor having a first terminal and a second terminal, a first transformer isolated converter circuit having a first input terminal, a second input terminal, a first output terminal and a second output terminal and having a conversion voltage ratio of m to n a second transformer isolated converter circuit having a first input terminal, a second input terminal, a first output terminal and a second output terminal, and having a conversion voltage ratio of m to n the first input terminal of the first transformer isolated converter circuit being connected to the first terminal of the first capacitor, the second input terminal of the first transformer isolated converter circuit being connected to the second terminal of the first capacitor, the first input terminal of the second transformer isolated converter circuit being connected to the first terminal of the second capacitor, the second input terminal of the second transformer isolated converter circuit being connected to the second terminal of the second capacitor the first output terminal of the first transformer isolated converter circuit being connected to the fist output terminal of the second transformer isolated converter circuit and the first terminal of the third capacitor, the second output of the first transformer isolated converter circuit being connected the second output terminal of the second transformer isolated converter circuit and the second terminal of the third capacitor, whereby the voltage from the first terminal of the third capacitor to the second terminal of the third capacitor is the output voltage of the power converter, and whereby the ratio of the output voltage of the power converter to the input voltage of the power source is equal to the transformer conversion ratio divided by the difference of two and D.

* * * * *